(12) United States Patent
Masukawa et al.

(10) Patent No.: US 7,455,710 B2
(45) Date of Patent: Nov. 25, 2008

(54) HONEYCOMB STRUCTURE AND METHOD OF MANUFACTURING THE SAME

(75) Inventors: Naoshi Masukawa, Nishikasugai-gun (JP); Shuichi Ichikawa, Handa (JP)

(73) Assignee: NGK Insulators, Ltd., Nagoya (JP)

( * ) Notice: Subject to any disclaimer, the term of this patent is extended or adjusted under 35 U.S.C. 154(b) by 486 days.

(21) Appl. No.: 10/535,096

(22) PCT Filed: Mar. 18, 2004

(86) PCT No.: PCT/JP2004/003672

§ 371 (c)(1),
(2), (4) Date: Nov. 28, 2005

(87) PCT Pub. No.: WO2004/083149

PCT Pub. Date: Sep. 30, 2004

(65) Prior Publication Data

US 2006/0150597 A1  Jul. 13, 2006

(30) Foreign Application Priority Data

Mar. 19, 2003  (JP) ............................. 2003-076405

(51) Int. Cl.
*B01D 46/00* (2006.01)
*F01N 3/022* (2006.01)
*C03B 29/00* (2006.01)

(52) U.S. Cl. ...................... 55/523; 55/282.3; 55/385.3; 55/428; 55/484; 55/524; 55/DIG. 5; 55/DIG. 10; 55/DIG. 30; 60/299; 60/311; 422/177; 422/180; 428/116; 264/629; 264/DIG. 48; 95/273; 502/439

(58) Field of Classification Search ................. 55/282.2, 55/282.3, 385.3, 482, 483, 484, 523, 524, 55/DIG. 5, DIG. 10, DIG. 30; 60/297, 299, 60/300, 303, 311; 422/177, 180; 428/116, 428/117, 118; 156/60; 264/628, 630, 631, 264/DIG. 48; 95/273; 502/439
See application file for complete search history.

(56) References Cited

U.S. PATENT DOCUMENTS

| 6,224,756 | B1 * | 5/2001 | Hongo ...................... 210/150 |
| 6,797,666 | B2 * | 9/2004 | Harada et al. ................ 428/116 |
| 7,214,253 | B2 * | 5/2007 | Bardon et al. ................. 55/523 |
| 7,309,277 | B2 * | 12/2007 | Nishio et al. ................... 451/51 |
| 7,332,014 | B2 * | 2/2008 | Ono et al. ..................... 55/523 |
| 2002/0197193 | A1 * | 12/2002 | Harada et al. ................ 55/523 |
| 2004/0108056 | A1 * | 6/2004 | Fujita et al. ................. 156/276 |

FOREIGN PATENT DOCUMENTS

EP    1 854 773 A1  * 11/2007
JP    A 4-367574     12/1992

(Continued)

*Primary Examiner*—Jason M Greene
(74) *Attorney, Agent, or Firm*—Oliff & Berridge, PLC

(57) ABSTRACT

A honeycomb structure includes honeycomb segments separated by porous partitions and having circulation holes through the honeycomb segments in an axial direction; a spacer positioned between neighboring honeycomb segments of the honeycomb segments; and a bonding layer located between honeycomb segments where the spacers are positioned and bonding the neighboring honeycomb segments. The spacer has Young's modulus in a range of 0.1 to 1.5 GPa. A ratio of area of the spacer to area of the bonding layer between the neighboring honeycomb segments is in a range of 0.2 to 30%.

10 Claims, 3 Drawing Sheets

FOREIGN PATENT DOCUMENTS

| | | | |
|---|---|---|---|
| JP | A 2002-60279 | | 2/2002 |
| JP | 2002-102627 | * | 4/2002 |
| JP | A 2002-102627 | | 4/2002 |
| JP | A 2002-273124 | | 9/2002 |
| WO | WO 02/070106 A1 | | 9/2002 |
| WO | WO 03/031371 A1 | | 4/2003 |

* cited by examiner

HONEYCOMB STRUCTURE AND METHOD OF MANUFACTURING THE SAME

TECHNICAL FIELD

The present invention relates to a honeycomb structure, which is applied to DPFs (Diesel Particulate Filters) and the other collection filters for trapping and removing particulates which are contained in exhaust-gas emitted from diesel engines or the like, and relates to a method of manufacturing the same.

BACKGROUND ART

This kind of honeycomb structure has such a structure in which porous honeycomb segments made of silicon carbide or the like are bonded using bonding layer and formed into a predetermined shape with a circular cross-section or the like, and then the periphery thereof is covered with a coating material layer. This honeycomb structure is located in an exhaust system of a diesel engine, and thereby is employed for purifying the exhaust-gas.

Each of the honeycomb segments is separated by porous partition walls, and has a large number of circulation holes extending therethrough in the axial direction. Neighboring circulation holes have one-side ends alternately plugged. Specifically, a circulation hole has an open end on one side, while has a plugged end on the other side. Another circulation holes neighboring to this hole have plugged ends on said one side, while has open ends on the other side.

By adopting such a structure, when exhaust-gas flows into the circulation holes through open ends, the exhaust-gas passes through the porous partition walls to flow out from another circulation holes. Therefore, the partition walls trap the particulates in the exhaust-gas while the exhaust-gas passes through the partition walls, allowing for purification of the exhaust-gas.

In such a honeycomb structure, a structure in which a plurality of honeycomb segments are bonded is adopted, and bonding layers are preferably uniform in thickness. The reason is as follows: Bonding layers with nonuniform thickness cause partially nonuniform thermal conductivity, which tends to cause stress concentration during use at a high temperature, thus deteriorating the durability of the honeycomb structure. In addition, excessively thick bonding layers increase pressure loss in the honeycomb structure, thus lowering efficiency of trapping particulates. On the other hand, excessively thin bonding layers reduce the effect of stress relaxation by the bonding layers.

For the bonding layers with a uniform thickness, conventionally, it has been implemented that, with spacers (space retaining members) of a prescribed thickness made of paper, inorganic materials, ceramics, organic fibers, resin, or the like located between the honeycomb segments, bonding of honeycomb segments allows the bonding layers and spacers to be approximately equal in thickness to each other (Japanese Patent Laid-Open Publication No. 2002-102627).

Bonding of honeycomb segments to each other is performed by fixing the spacers on the honeycomb segment, applying a bonding material to the honeycomb segment with the spacers fixed, and then pressing the honeycomb segments. In the bonding of the honeycomb segments in such a way, achievement of sufficient bonding strength requires application of a pressure of a certain level or more to the honeycomb segments. However, there has been the case that, when the pressure is applied thereto, biting of the spacers into the honeycomb segments, or the like occurs, causing damage to the honeycomb segments.

DISCLOSURE OF THE INVENTION

An objective of the present invention is to provide a honeycomb structure, which prevents occurrence of the damage to honeycomb segments due to spacers during bonding of the honeycomb segments, and has honeycomb segments well bonded together.

To achieve the objective, a honeycomb structure according to an embodiment of the invention has honeycomb segments separated by porous partitions and having circulation holes through the honeycomb segments in an axial direction; a spacer positioned between neighboring honeycomb segments of the honeycomb segments; and a bonding layer located between honeycomb segments where the spacer is positioned and bonding the neighboring honeycomb segments. The spacer has Young's modulus in a range of 0.1 to 1.5 GPa, and a ratio of area of the spacer to area of the bonding layer between respective neighboring honeycomb segments is in a range of 0.2 to 30%.

A method of manufacturing a honeycomb structure according to embodiment of the invention has the step of positioning a spacer with Young's modulus of 0.1 to 1.5 GPa on a joining face as an outer peripheral face of a honeycomb segment which is separated by a porous partition and has circulation holes through the honeycomb segment in an axial direction, with a ratio of area of the spacer to area of the joining face in a range of 0.2 to 30%; the step of plastering a bonding material on the joining face having the spacer fixed to the joining face; the step of stacking another honeycomb segment on the joining face to form a honeycomb-segment stacked assembly; and the step of applying a pressure to the honeycomb-segment stacked assembly from the outside to bond the honeycomb segment and said another honeycomb segment to each other.

BRIEF DESCRIPTION OF THE DRAWINGS

FIG. 4 illustrates the step of locating spacers on a joining face of the honeycomb segment. FIG. 5 illustrates the step of coating the joining face with a bonding material. FIG. 6 illustrates the step of bonding the two honeycomb segments with the bonding material interposed therebetween.

BEST MODE FOR CARRYING OUT THE INVENTION

Figure 1:
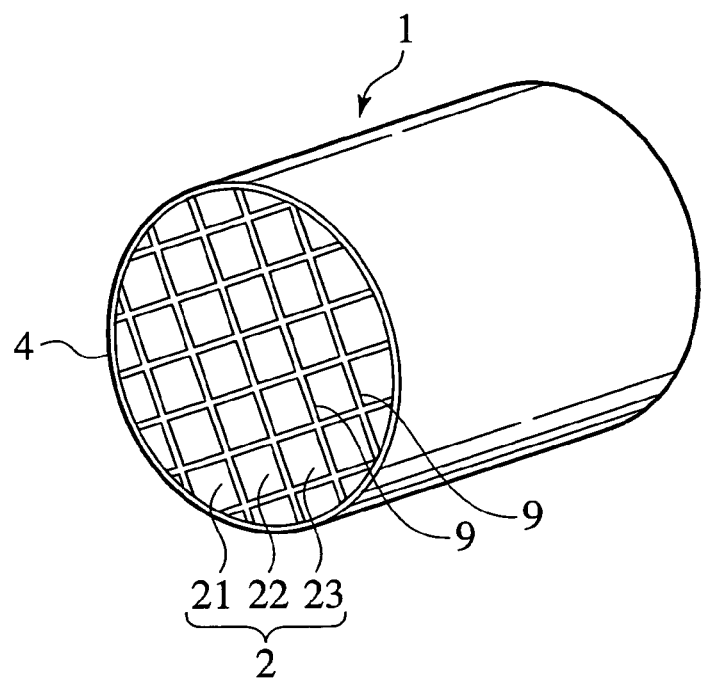
FIG. 1 is a perspective view of a honeycomb structure according to an embodiment of the present invention.

A honeycomb structure according to an embodiment of the present invention includes a plurality of honeycomb segments 2 (21, 22, 23, and the like) bonded together with bonding layers 9 as illustrated in FIG. 1. The honeycomb structure is constructed as follows. Specifically, after bonding of the honeycomb segments 2, the honeycomb structure is ground into a circular cross-section, elliptical cross-section, triangular cross-section, or another cross-section, with the periphery covered with a coating agent layer 4.

Figure 2:
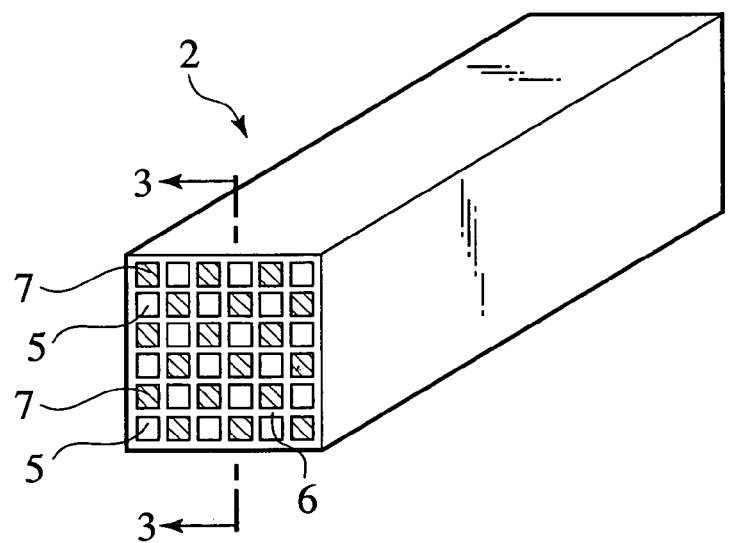
FIG. 2 is a perspective view of a honeycomb segment according to the embodiment of the present invention.
Figure 3:
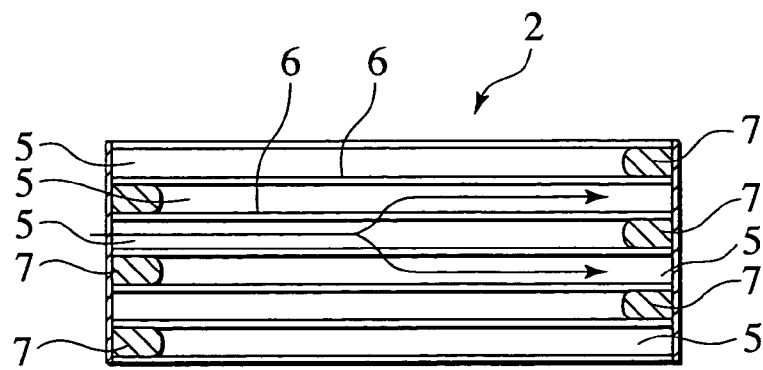
FIG. 3 is a cross-sectional view of the honeycomb segment illustrated in FIG. 2.

Each of the honeycomb segments 2 has a large number of circulation holes 5 which are separated by porous partition walls 6 as illustrated in FIGS. 2 and 3. The circulation holes 5 are through the honeycomb segment 2 in the axial direction, and ends of neighboring circulation holes 5 are alternately plugged with the filling material 7. Specifically, a circulation hole 5 has an open left end and a right end plugged with the filing material 7. Another circulation hole 5 neighboring to this hole has a left end plugged with the filling material 7 and an open right end.

According to this structure, when the honeycomb structure 1 is used as a DPF for example, as illustrated by the arrows in FIG. 3, exhaust-gas flows into the circulation holes with open left ends, and then the exhaust-gas passes through the porous partition walls to flow out from the other circulation holes. While the exhaust-gas passes through the partition walls 6, the partition walls 6 traps the particulates in the exhaust-gas, thus allowing for exhaust-gas purification.

The honeycomb segment 2 adopts a square cross-section, which may be replaced by an appropriate shape of cross-section such as a triangular cross-section, hexagonal cross-section, and the like. In addition, the circulation holes 5 may adopt a shape in cross-section such as a triangle, hexagon, circle, ellipse, and the other shapes.

The honeycomb segment 2, in view of strength and heat-resistance, preferably employs a material or a combination of materials, selected from the group of cordierite, mullite, alumina, spinel, silicon carbide, silicon carbide-cordierite composite, silicon-silicon carbide composite, silicon nitride, lithium aluminum silicate, aluminum titanate, and Fe—Cr—Al alloy.

In addition, the honeycomb segment 2 has thermal conductivity preferably in a range of 10 to 60 W/m·K more preferably in a range of 15 to 55 W/m·K, and most preferably in a range of 20 to 50 W/m·K. Accordingly, from such a viewpoint, silicon carbide or a silicon-silicon carbide composite is particularly suitable for the material of the honeycomb segment 2.

In the manufacture of the honeycomb segment 2, a plastic puddle is prepared by adding binders such as methylcellulose, hydroxypropoxyl cellulose, hydroxyethyl cellulose, carboxymethyl cellulose, and polyvinyl alcohol, surfactants, water, or the like to a material selected from the above-mentioned materials. The puddle is extruded into a honeycomb shape having a large number of circulation holes 5 through the honeycomb shape in the axial direction, the circulation holes being separated by the porous partition walls 6. Thereafter, this is dried by means of microwave irradiation, hot air, or the like, and then sintered, which manufactures the honeycomb segment 2.

Figure 4:
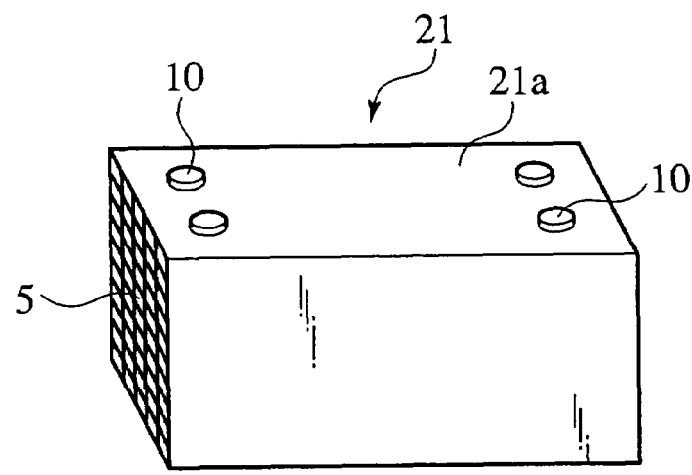
FIGS. 4 to 6 are perspective views illustrating steps for bonding the honeycomb segments in the manufacturing process of the honeycomb structure according to the embodiment of the present invention.
Figure 5:
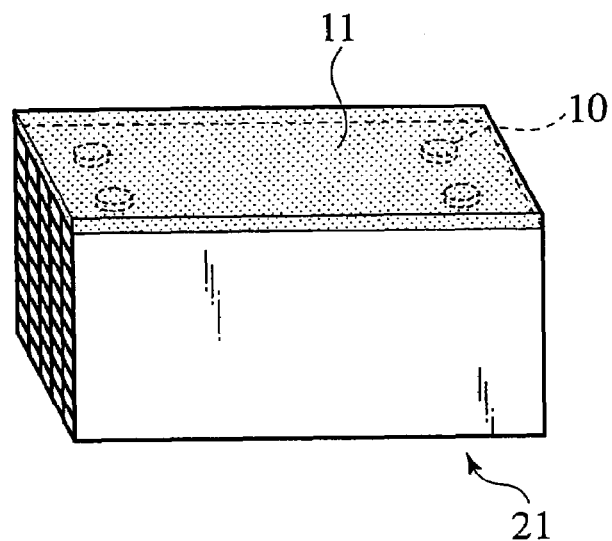
Figure 6:
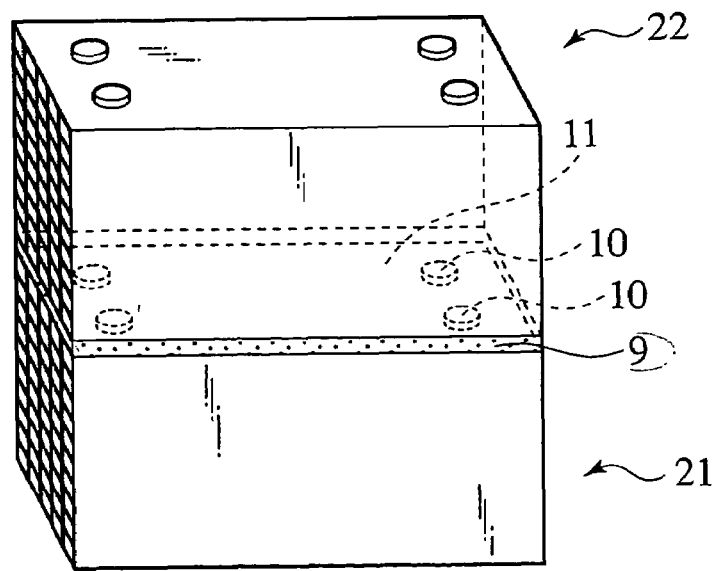

FIGS. 4 to 6 illustrates a basic procedure for bonding the honeycomb segments 2. It is noted that although the number of the honeycomb segments 2 to be bonded is not limited to two, for convenience, the description is given by citing the case where two honeycomb segments 21 and 22 are bonded.

In the manufacturing process of the honeycomb structure of the present embodiment, prior to the bonding, spacers 10 are located on the joining face 21a of the honeycomb segment 21 as illustrated in FIG. 4. Subsequently, a bonding material 11 is applied on the joining face 21a on which the spacers are located as illustrated in FIG. 5. After that, the other honeycomb segment 22 is stacked on the applied, bonding material 11 as illustrated in FIG. 6, and then the stacked body is pressed from the outside, thus bonding the two honeycomb segments 21 and 22. During pressing, it is preferable to press the honeycomb segments with a pressure ranging from 0.3 to 3 kgf/cm$^2$, and it is more preferable to press them with a pressure ranging from 0.5 to 2 kgf/cm$^2$.

Repetition of the bonding procedure illustrated in FIGS. 4 to 6 allows the required number of honeycomb segments 2 to be bonded, forming an integrated honeycomb segment collected assembly. Incidentally, the pressing step may be performed for the stacked body consisting of three or more honeycomb segments at one time.

The spacers 10 are located between the honeycomb segments 21 and 22 neighboring to each other for the bonding layer 9 made of the bonding material 11 with a uniform thickness (see FIGS. 1 and 6). The positions to place the spacers 10 are not limited to the four corner portions illustrated in FIG. 4. The positions may be appropriately changed, as long as the honeycomb segment 22 to be stacked is supported parallel to the joining face 21a In this case, shapes and sizes of the spacers 10 are set such that the ratio of the total area of all the spacers 10 to the area of the bonding layer 9 is equal to the below-mentioned ratio.

As a material for the bonding material 11, one which is suited for the material of the honeycomb segment 2 is used. Accordingly, as the bonding material 11, one which contains ceramics as the main ingredient is suitable, and it is possible to select a material in which metal such as metal fibers, pore-forming materials, particles of various kinds of ceramics, or the like is added to a mixture of inorganic particles or fibers of silicon carbide, silicon nitride, cordierite, alumina, mullite, or the like, and colloidal sol such as colloidal silica, colloidal alumina, or the like, according to need.

It is necessary for the thermal conductivity of the bonding material 11 to be 0.1 to 5 W/m·K, and more preferably 0.2 to 3 W/m·K. If the thermal conductivity of the bonding material 11 is less than 0.1 W/m·K, heat transfer between the honeycomb segments 2 is inhibited to render temperature in the honeycomb structure nonuniform, and thus this is not preferable. On the other hand, if the thermal conductivity exceeds 5 W/m·K, bonding strength is lowered, and the manufacture becomes difficult.

In view of the necessity for preventing cracks due to thermal shock or the like from occurring, the coefficient of thermal expansion of the bonding material 11 is preferably relatively low. Accordingly, the coefficient of thermal expansion is preferably in a range from $1 \times 10^{-6}$ to $8 \times 10^{-6}$/° C., more preferably in the range from $1.5 \times 10^{-6}$ to $7 \times 10^{-6}$/° C., and most preferably in the range from $2 \times 10^{-6}$ to $6 \times 10^{-6}$/° C.

As a material of the spacer 10, one which has the same property as that of the honeycomb segment 2 or the bonding material 11, metal, or an organic material such as resin and rubber may be used.

When the honeycomb structure is used as a DPF, if local gaps exist in the bonding layer 9, they cause the difference in the coefficient of thermal conductivity between the gap and the surrounding area, which produces stress concentration This causes the probability of deteriorating durability of the DPF. If this point is considered, it is preferable that the spacer 10 has heat resistance of about 1200° C. at which the DPF is used, and ceramics, inorganic materials, metal, or the like may be used as the material. Particularly, a material is preferable, which has a material composition and physical properties at high temperatures (for example, coefficient of thermal expansion, coefficient of thermal conductivity, and the like) similar to those of the bonding material 11.

In the honeycomb structure according to the embodiment of the present invention, Young's modulus of the spacers 10 and the ratio of the total area of spacers 10 which are disposed between two of the honeycomb segments 2 (for example, between the honeycomb segments 21 and 22 illustrated in FIG. 6) to the area of the bonding layer 9 are set as follows. That is, the ratio of the total area of the spacers 10 to the area of the bonding layer 9 is set to 0.2 to 30%. The ratio of the areas is more preferably 0.4 to 25%, and most preferably 0.6 to 20%. The reasons for this are as follows. If the ratio of the total area of the spacers 10 to the area of the bonding layer 9 is less than 0.2%, it does not exhibits the effect that the constant clearance is retained between the two honeycomb segments 21 and 22 to render the thickness of the bonding layer uniform. On the other hand, the ratio exceeds 30%, it lowers mutual bonding strength between honeycomb segments 21 and 22, thus causing trouble in the durability of the honeycomb structure. Incidentally, the bonding layer 9 is formed to cover the spacers 10, and the area of the bonding layer 9 is equivalent to the area of the joining face 21a of the honeycomb segment 2, including the area of the spacers 10.

However, even if the requirement on the range of the ratio of the areas described-above is satisfied, there is a case where, during pressing the plurality of honeycomb segments 2 from the outside for bonding, the spacers 10 damage the honeycomb segments 2, and biting of the spacers 10 into the honeycomb segments causes breaking of the honeycomb segments 2 or deterioration of the isostatic strength of the honeycomb structure 1.

For this reason, in the honeycomb structure of this embodiment, in addition to the requirement concerning the ratio of the areas described-above, Young's modulus of the spacers 10 is set in the range of 0.1 to 1.5 GPa. The spacers 10 having Young's modulus within the above-described range are used to prevent the spacers 10 from biting into the honeycomb segments 2 in the bonding of the honeycomb segments, thus reducing damage to the honeycomb segments 2. Additionally, the absence of biting of the spacers thereinto allows the thickness of the bonding layer 9 to be adjusted more precisely by the spacers 10.

Young's modulus of the spacers 10 is in the range of 0.1 to 1.5 GPa described-above, and preferably in the range of 0.15 to 1.2 GPa, and more preferably in the range of 0.2 to 0.7 GPa The setting in such a manner allows variation in the thickness of the bonding layers 9 to be decreased, thus preventing fracture at a low value from occurring in an isostatic strength test. It is noted that, Young's modulus of less than 0.1 GPa causes the space-retaining capability of the spacers to be reduced, which increases variations in the thickness of the bonding layers. On the other hand, if Young's modulus exceeds 1.5 GPa, the external pressure, applied during bonding of honeycomb segments 2 causes the spacers 10 to bite into the honeycomb segments, thereby inducing breakage of the honeycomb segments 2 or deterioration of the isostatic strength of the honeycomb structure.

The spacers 10 of this embodiment may employ ceramics as a material. Although ceramics have generally high Young's modulus, the ceramics is controlled in porosity in the range of 35 to 90%, being a spacer material with a Young's modulus in the range of 0.1 to 1.5 GPa.

The porosity of ceramics in the range of 35 to 90% is controlled by addition of a pore-forming material to the ceramics. A suitable pore-forming material may employ various kinds of organic materials such as resin balloon foamed into a balloon shape, various kinds of inorganic materials such as Shirasu balloon, Fly-ash balloon, or the like. In addition, it may employ flour, starch, phenolic resin, polymethyl methacrylate, polyethylene, polymethacrylate, polyethylene terephthalate, or the like. The pore-forming material may employ one or more kinds of these materials in a combination.

When the honeycomb structure 1 is used as a DPF, an opening portion of the circulation hole 5 is preferably plugged with the filling material 7, and the ends of the circulation holes 5 is preferably alternately plugged into a check pattern. Closing with the filling material 7 is performed as follows: The end face of the honeycomb segment 2 is covered with a resin film; the ends of circulation holes 5 to be plugged are irradiated with laser light and are opened, with the ends of circulation holes 5 to be unclosed left as they are; and the opened circulation holes 5 are plugged with the slurry of the filling material under pressure. After this plugging under pressure, the honeycomb segment is dried and sintered to perform the closing by means of the filling material 7. As for the filling material 7, a material similar to that of the honeycomb segment 2 may be used.

EXAMPLE

As a raw material, plastic puddle was prepared as follows: SiC powder and metal silicon powder was mixed in the ratio by mass of 80:20; starch and resin balloon serving as pore-forming materials were added to the mixture; methylcellulose and hydroxypropoxyl methylcellulose, as well as surfactant and water were also added to the mixture. This puddle was extruded, and then dried by means of microwave irradiation and hot air to form a honeycomb segment. Thereby, a honeycomb segment was manufactured, in which the partition walls had a thickness of 310 μm, the cell density was about 46.5 cells/cm$^2$ (300 cell/square inch), the cross-section thereof was a square with sides of 35 mm, and the length thereof was 152 mm.

Next, one ends of the circulation holes were plugged using a material similar to that of the honeycomb segment in such a way that the closed ends of the neighboring circulation holes were on opposite sides so that the end faces of the honeycomb segment showed a check pattern. Then, the honeycomb segment was dried. Thereafter, the honeycomb segment was calcinated in an air atmosphere at about 400° C., and then sintered in an Ar inert atmosphere at about 1450° C., thereby a honeycomb segment made of Si-bond SiC was obtained Additionally, a slurry, which was the bonding material, was prepared by mixing silicon carbide of 45% by mass, aluminosilicate fiber of 28% by mass, silica sol of 20% by mass, clay of 1% by mass, and water of 6% by mass.

Moreover, a resin balloon was added to the above-mentioned bonding material, the slurry, and then the slurry was dried and solidified to produce spacers Nos. 1 to 4 with a thickness of 1 mm. It is noted that, in the spacers Nos. 1 to 4, the amount of resin balloon to be added was changed, and thus the porosity was controlled. In addition, a spacer No. 5 with a thickness of 1 mm was made by use of the same material as that of the honeycomb segment. Young's moduli and porosities of the spacers Nos. 1 to 5 are shown in Table 1.

Incidentally, Young's modulus of the spacers was measured by a three-point bending test in compliance with JIS R1601. Additionally, as for the porosity of the spacers, the apparent porosity was measured in compliance with JIS R2205.

TABLE 1

| Spacer No. | Young's modulus (GPa) | Porosity (%) |
|---|---|---|
| 1 | 0.5 | 75 |
| 2 | 1.2 | 50 |
| 3 | 0.08 | 95 |
| 4 | 2.0 | 20 |
| 5 | 30 | 50 |

Four kinds of spacers with different sizes, all of which were spacers No. 1 with Young's modulus of 0.5 GPa, were prepared By the use of the spacers No. 1 with respective sizes, two honeycomb segments were bonded following the below-mentioned procedure, and thus honeycomb segment bonded assemblies Nos. 1 to 4 were made. Specifically, the spacers No. 1 were fixed onto a joining face of one of the honeycomb segments, and a bonding material was plastered on the joining face. Thereafter, the other honeycomb segment was stacked on the surface to which the bonding material was plastered, a pressure of 2 kgf/cm² was applied to the top and bottom of the honeycomb segments, and this was dried for 5 hours at 200° C. Thereby, the two honeycomb segments were bonded. Following a similar procedure, for each size of the spacers No. 1, ten pairs of honeycomb segment bonded assemblies were made. For each honeycomb segment bonded assembly, the distance between the two honeycomb segments, that is, the thickness of the bonding layer was measured, and (the minimum value of the thickness)–(the maximum value of the thickness) was defined as variation in the thickness of the bonding layers.

Figure 7:
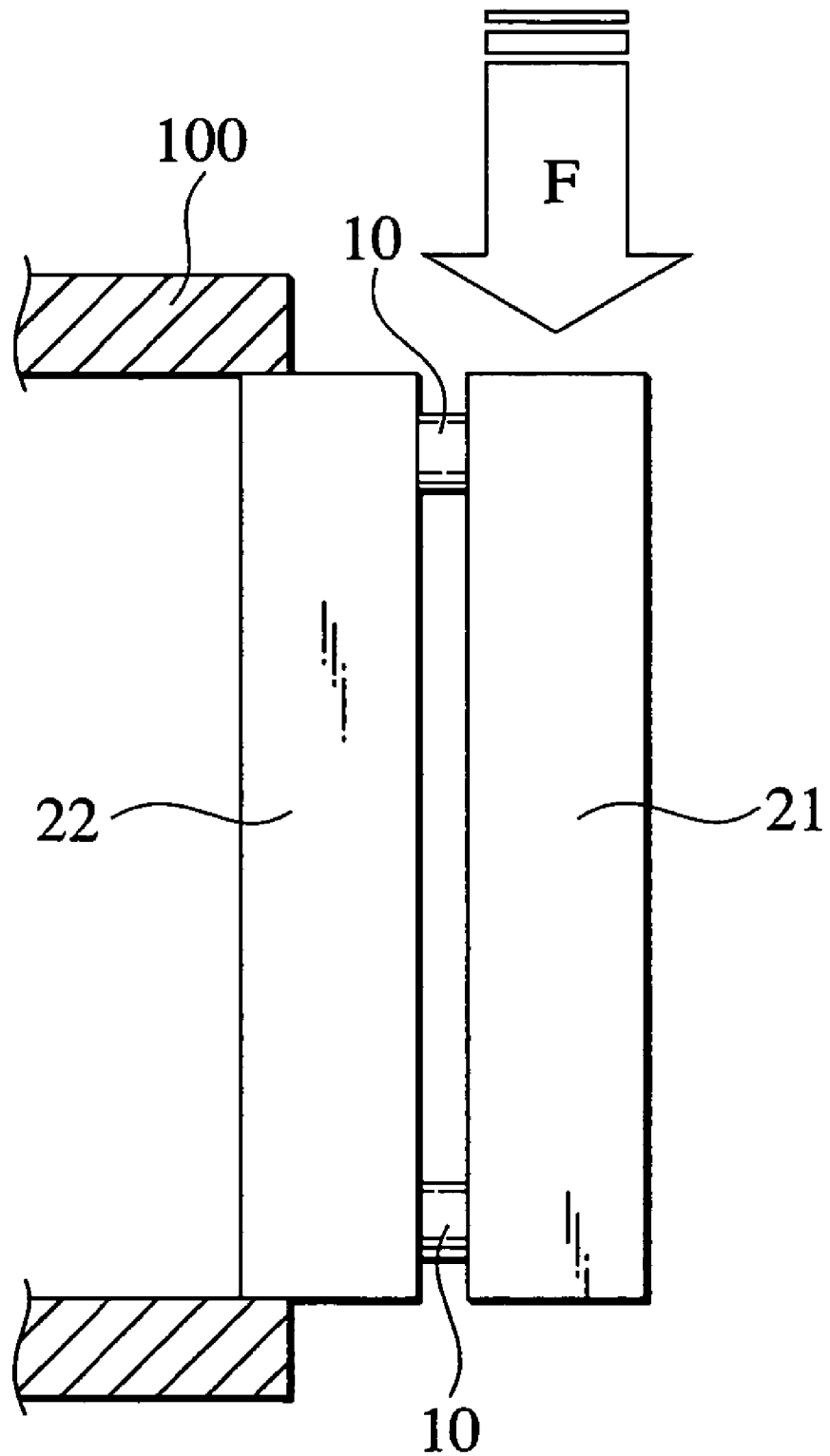
FIG. 7 is a schematic view illustrating a method of measuring the bonding strength of the honeycomb segments.

Additionally, for each honeycomb segment bonded assembly, the bonding strength was measured in a way illustrated in FIG. 7. Specifically, one honeycomb segment 22 in a sample where two honeycomb segments 21 and 22 were bonded was fixed by means of a jig 100, and then a load F was applied to the other honeycomb segment 21 in a longitudinal direction, where thereby the bonding strength was measured.

Table 2 shows, for each of the honeycomb segment bonded assemblies, ratio of area of spacers to area of a bonding layer, variation in thickness of bonding layers, and average in bonding strength.

TABLE 2

| Honeycomb Segment bonded Assembly | (Area Of Spacers)/(Area Of Bonding layer) × 100 (%) | Variation In Thickness Of Bonding Layers (mm) | Bonding Strength (kPa) |
|---|---|---|---|
| Example 1 | 10 | 1.1-1.3 | 270 |
| Example 2 | 4 | 1.1-1.4 | 280 |
| Comparative Example 1 | 0.1 | 0.3-1.1 | 300 |
| Comparative Example 2 | 50 | 1.1-1.3 | 150 |

As shown in Table 2, if area of spacers is smaller than 0.2% of area of a bonding layer, the variation in the thickness of bonding layers is large, causing thermal stress concentration during use. On the other hand, if it is larger than 30%, bonding strength is significantly lowered.

Next, by use of the spacers Nos. 1 to 5 as shown in Table 1, in such a condition where the area of spacers was equal to 10% of the area of the bonding layer, honeycomb segment bonded assemblies were made following a procedure similar to the above-described procedure.

Thereafter, each of the honeycomb segments was pulled off from the honeycomb segment bonded assembly, and the surface of the joining face of the honeycomb segment was observed.

Moreover, similarly, 16 pieces of honeycomb segment bonded assemblies were made, and after that, the peripheries thereof were ground and coated, forming honeycomb structures with a cross-sectional dimension of 144 mm×152 mm. Thereafter, the honeycomb structures were measured in isostatic strength The results are shown in Table 3.

TABLE 3

| | Used Spacer No. | Variation In Thickness of Bonding Layers (mm) | Outer Appearance Of Joining Part After Removal | Isostatic Strength (MPa) | Broken Location |
|---|---|---|---|---|---|
| Example 3 | 1 | 1.1-1.3 | Not Changed | 12 | Outer Peripheral Portion |
| Example 4 | 2 | 1.1-1.3 | Not Changed | 10 | Outer Peripheral Portion |
| Comparative Example 3 | 3 | 0.4-1.1 | Not Changed | 12 | Outer Peripheral Portion |
| Comparative Example 4 | 4 | 1.0-1.3 | Not Changed | 4 | Vicinities of Spacers |
| Comparative Example 5 | 5 | 0.8-1.4 | Broken | — | — |

As is shown by the result in Table 3, in the case of the honeycomb structures of the comparative example 4 using the spacers No. 4 whose Young's modulus was larger than 1.5 GPa, the honeycomb structures were broken at the vicinities of the spacers at low values in the isostatic strength test.

Additionally, if the Young's modulus was larger, when a pressure was applied for bonding, the spacers bit into the honeycomb segments and broke the honeycomb segments. On the other hand, if the Young's modulus was smaller than 0.1 GPa, the variation in the thickness of the bonding layers increases, causing thermal stress concentration during use.

As described above, according to the honeycomb structure and the method of manufacturing the same of the present invention, Young's modulus of the spacers located between the neighboring honeycomb segments is set in a predetermined range of 0.1 to 1.5 GPa, and ratios of areas of the spacers to area of the bonding layers are set in a predetermined range of 0.2 to 30%. Therefore, the spacers do not bite into the honeycomb segments when the pressure is applied during bonding of the honeycomb segments, thereby inhibiting damage to the honeycomb segments. At the same time, ensuring of sufficient area to the bonding layer achieves the bonding layer with satisfactory bonding strength and uniform thickness.

The invention claimed is:

1. A honeycomb structure comprising:
   honeycomb segments separated by porous partitions and having circulation holes through the honeycomb segments in an axial direction;
   a spacer positioned between neighboring honeycomb segments of the honeycomb segments; and
   a bonding layer located between honeycomb segments where the spacer is positioned and bonding the neighboring honeycomb segments, wherein the spacer has Young's modulus in a range of 0.1 to 1.5 GPa,
wherein a ratio of area of the spacer to area of the bonding layer between respective neighboring honeycomb segments is in a range of 0.2 to 30%.

2. The honeycomb structure according to claim 1, wherein the spacer has porosity of 35 to 90%.

3. The honeycomb structure according to claim 2, wherein the spacer includes a pore-forming material.

4. The honeycomb structure according to claim 2, wherein the spacer is formed of ceramics.

5. The honeycomb structure according to claim 1, wherein the Young's modulus is in a range of 0.15 to 1.2 GPa.

6. The honeycomb structure according to claim 1, wherein the ratio of area of the spacer to area of the bonding layer is in a range of 0.4 to 25%.

7. A method of manufacturing a honeycomb structure, comprising the steps of:
positioning a spacer with Young's modulus of 0.1 to 1.5 GPa on a joining face as an outer peripheral face of a honeycomb segment which is separated by a porous partition and has circulation holes through the honeycomb segment in an axial direction, with a ratio of area of the spacer to area of the joining face in a range of 0.2 to 30%;
plastering a bonding material on the joining face having the spacer fixed to the joining face;
stacking another honeycomb segment on the joining face to form a honeycomb-segment stacked assembly; and
applying a pressure to the honeycomb-segment stacked assembly from the outside to bond the honeycomb segment and said another honeycomb segment to each other.

8. The method of manufacturing a honeycomb structure according to claim 7,
wherein, as the spacer, a spacer with porosity of 35 to 90% is used.

9. The method of manufacturing a honeycomb structure according to claim 8,
wherein the spacer is controlled in porosity by a pore-forming material.

10. The honeycomb structure according to claim 3, wherein the spacer is formed of ceramics.

* * * * *